Patented Apr. 28, 1936

2,038,620

UNITED STATES PATENT OFFICE 2,038,620

MANUFACTURE OF ORTHO-NITRO-ANISOLE

Henry J. Weiland and Otto Stallmann, South Milwaukee, Wis., assignors to E. I. du Pont de Nemours & Company, Wilmington, Del., a corporation of Delaware No Drawing. Application August 23, 1934, Serial No. 741,148

5 Claims. (Cl. 260—142)

This invention relates to the preparation of ortho-nitro-anisole and has for its object the improvement of the process for the methoxylation of ortho-nitro-chlorobenzene with methyl alcohol in the presence of caustic alkali.

Heretofore, in the preparation of ortho-nitro-anisole, nitro-chlorobenzene has been reacted with methyl alcohol in the presence of sodium or potassium hydroxide at reflux temperatures (approximately 71° C.). (See U. S. Patent 695,812 and German Patents 137,956 and 140,133.) The product obtained when the process is carried out at reflux temperatures, unless further purified, is highly colored and has a relatively low crystallizing point, for it contains substantial quantities of ortho-nitro-phenol and other highly colored bodies.

We have found after very extensive experimentation that by modifying the conditions under which the reaction is carried out, a very high grade ortho-nitro-anisole can be obtained, which is comparatively free from impurities and which can be used directly for the production of valuable intermediates for dyestuffs without requiring costly and tedious purification methods. We have found that by carrying out the methoxylation at temperatures between about 40 and about 62° C., substantially no side products are formed and an ortho-nitro-anisole having a crystalizing point of approximately 10.0° is obtained after removal of the alcohol, followed by alkali washing of the crude oil, without further purification.

The following examples are given to more fully illustrate various methods of carrying out our invention. The parts used are by weight.

Example 1

709 parts of ortho-nitro-chlorobenzene, 388 parts of potassium hydroxide (85%) and 7090 parts of 90% by weight methyl alcohol sp. gr. 0.825 are mixed together, and the entire mass is maintained at 45° C. with good agitation until reaction practically comes to a standstill. The temperature is then raised slowly to 50° C. and held as before until the reaction ceases. Finally, to obtain the maximum yield and good quality material, the temperature is elevated to 60° C., and held until no further reaction occurs, as indicated by crystallizing point of the ortho-nitro-anisole formed.

Isolation of the ortho-nitro-anisole can be accomplished by any known method as described in the literature, as for example, by distillation to remove unreacted alcohol which can be re-used, or by extensive dilution with water to separate the finished ortho-nitro-anisole from aqueous alcohol and alkali soluble by-products. Procedure as in this example gives a 93.0–96% yield of a high grade ortho-nitro-anisole (C. P. (dry) 9.9–10° C.).

The potassium hydroxide can be replaced entirely or in part by sodium hydroxide with equally goods results, as shown in the following two examples.

Example 2

100 parts of ortho-nitro-chlorobenzene, 364 parts of methyl alcohol 99%, 36 parts of water, 63.6 parts of 95% sodium hydroxide are mixed together. The procedure is exactly the same as in Example 1, the mixture being held at 45°, 50°, and 60° C. until fully reacted at each of the designated temperatures. A 94.1% yield of ortho-nitro-anisole (C. P. 10.1° C. (dry)) is obtained from the reaction mixture. 3% of ortho-nitro-phenol is also formed.

Example 3

The following example shows a mixture of KOH and NaOH, methyl alcohol and ortho-nitro-chlorobenzene which gives satisfactory results.

640 parts of ortho-nitro-chlorobenzene, 19.7 parts of potassium hydroxide flakes, 339 parts of caustic soda and 1950 parts of 90% alcohol are mixed together. Proceeding as described in the earlier examples, and elevating the temperature gradually from 40° to 62° C. as the reaction proceeds, there can be isolated upon complete conversion a very high grade of ortho-nitro-anisole (chlorine content—0.08%).

Example 4

It is also possible in Examples 2 and 3, after reaction of ortho-nitro-chlorobenzene with alkali in 3 to 5 parts of alcohol, to separate two layers after cooling. One is a layer of salt and ortho-nitro-anisole, and the other an alkaline alcoholic solution of ortho-nitro-anisole. This alcoholic solution can be fortified by fresh alkali, and can be re-used directly for another methylation without the expense of redistilling the alcohol. The following example indicates the parts by weight and the procedure involved.

1950 parts of methyl alcohol, 352 parts of 95% caustic soda, 40 parts of potassium or sodium chloride are mixed at temperatures under 35° C. with 640 parts of ortho-nitro-chlorobenzene. The temperature is gradually raised to 45° C., at which point the mixture is held until any exothermic reaction has ceased. The temperature is then gradually raised to 60° C. at which point it is held until the reaction is completed. The mass is then cooled and settled. The alcohol layer is decanted from the layer of salt and pale yellow oil, which is later washed with water until free of alkali, then boiled to remove traces of alcohol, thereby yielding ortho-nitro-anisole which crystallizes at 10.2–10.3° C. (dry) (chlorine content—0.06% when freed of salt and alcohol). The alcoholic layer is titrated for alkali content. Sufficient fresh alkali, methyl alcohol and water are then added to start another methylation with fresh ortho-nitro-chlorobenzene in proportions and at temperatures already indicated. Ortho-nitro-anisole of excellent crystallizing point and quality is again obtained from the completed reaction mass.

The aforementioned examples specify the use of 3 to 10 parts of 90% methyl alcohol per part of ortho-nitro-chlorobenzene. It is obvious, of course, that alcohol concentrations can be varied considerably without an excessively detrimental effect upon the final result. The best working strength has been found to be substantially as indicated. Equally good results can be obtained at the temperature range specified, namely, 40–62° C., by using alcohol varying in strength from 80 to 99% by weight.

It should be noted that the quantity of alkali necessary for complete conversion of ortho-nitro-chlorobenzene to ortho-nitro-anisole at mild temperatures below the reflux can be varied considerably. However, the use of less than 1.3 moles per mole of ortho-nitro-chlorobenzene is impractical due to the slowing up of the reaction. Larger quantities of alkali than those disclosed in the examples may be employed but are not necessary.

The manner of adding the reactants is not of importance, as long as the temperature of the initial reaction mixture is not allowed to exceed 62° C. for any substantial period of time. In all cases, as long as there is any large excess alkali in the reaction mass, the temperature should not go above about 62° C., either in the condensation, isolation or purification steps. Since a number of hours are required in carrying out this reaction, it will be obvious that increases in temperature above 62° C. for short periods, particularly during the latter part of the reaction, may take place without substantially affecting the purity of the product. For uniformly good results, however, the temperature should not exceed 62° C.

We claim:

1. In the process for preparing ortho-nitro-anisole, the step which comprises carrying out the reaction between ortho-nitro-chlorobenzene and methyl alcohol of from 80 to 99% strength by weight in the presence of an alkali-metal hydroxide at temperatures of from 40 to 62° C.

2. In the process for preparing ortho-nitro-anisole from ortho-nitro-chlorobenzene and methyl alcohol, the step which comprises carrying out the reaction in the presence of an alkali-metal hydroxide at temperatures between 40 and 62° C.

3. In the process for preparing ortho-nitro-anisole from ortho-nitro-chlorobenzene and methyl alcohol, the step which comprises carrying out the reaction in the presence of an alkali-metal hydroxide at temperatures between 40 and 62° C., the molar ratio of alkali-metal hydroxide to ortho-nitro-chlorobenzene being not less than about 1.3 to 1.

4. In the process for preparing ortho-nitro-anisole from ortho-nitro-chlorobenzene and methyl alcohol, the step which comprises carrying out the reaction in the presence of an alkali-metal hydroxide at temperatures between 40 and 62° C., the temperature of the reaction mass being raised gradually from 40° C. as the reaction proceeds to about 60° C.

5. In the process for preparing ortho-nitro-anisole from ortho-nitro-chlorobenzene and methyl alcohol, the steps which comprise carrying out the reaction in the presence of an alkali-metal hydroxide, heating the mass at temperatures of about 45° C. and gradually raising the temperature as the reaction proceeds to about 60° C., the molar ratio of alkali-metal hydroxide used to ortho-nitro-chlorobenzene being not less than about 1.3 to 1.

HENRY J. WEILAND.
OTTO STALLMANN.